(12) United States Patent
Culbertson

(10) Patent No.: US 9,418,151 B2
(45) Date of Patent: Aug. 16, 2016

(54) LEXICAL ENRICHMENT OF STRUCTURED AND SEMI-STRUCTURED DATA

(71) Applicant: Raytheon Company, Waltham, MA (US)

(72) Inventor: Arthur R. Culbertson, Severna Park, MD (US)

(73) Assignee: Raytheon Company, Waltham, MA (US)

( * ) Notice: Subject to any disclaimer, the term of this patent is extended or adjusted under 35 U.S.C. 154(b) by 466 days.

(21) Appl. No.: 13/915,985

(22) Filed: Jun. 12, 2013

(65) Prior Publication Data

US 2013/0332458 A1    Dec. 12, 2013

Related U.S. Application Data

(60) Provisional application No. 61/658,444, filed on Jun. 12, 2012.

(51) Int. Cl.
*G06F 17/30* (2006.01)
*G06F 17/27* (2006.01)

(52) U.S. Cl.
CPC .......... *G06F 17/30731* (2013.01); *G06F 17/27* (2013.01); *G06F 17/30908* (2013.01)

(58) Field of Classification Search
CPC .......... G06F 17/30864; G06F 17/2785; G06F 17/30734; G06F 17/30731; G06F 17/30908; G06F 17/27
See application file for complete search history.

(56) References Cited

U.S. PATENT DOCUMENTS

| | | | | |
|---|---|---|---|---|
| 5,371,676 A | * | 12/1994 | Heemels | G06F 17/2735 707/E17.104 |
| 5,475,588 A | * | 12/1995 | Schabes | G06F 17/274 704/9 |
| 5,873,056 A | * | 2/1999 | Liddy | G06F 17/274 704/9 |
| 7,987,088 B2 | * | 7/2011 | Moitra | G06F 17/30734 704/10 |
| 9,037,615 B2 | * | 5/2015 | Bornea | G06F 17/30946 707/803 |
| 2002/0111792 A1 | * | 8/2002 | Cherny | G06F 17/277 704/8 |
| 2002/0143742 A1 | * | 10/2002 | Nonomura | G06F 17/30923 |
| 2006/0004826 A1 | * | 1/2006 | Zartler | G06F 17/277 |
| 2008/0082574 A1 | * | 4/2008 | Hosokawa | G06F 17/30569 |
| 2009/0037446 A1 | * | 2/2009 | Tonev | G06F 17/30917 |
| 2009/0138429 A1 | * | 5/2009 | Chowdhury | G06F 17/30923 |
| 2010/0114562 A1 | * | 5/2010 | Hutchinson | G06F 17/2229 704/9 |
| 2011/0078205 A1 | * | 3/2011 | Salkeld | G06F 17/30684 707/794 |
| 2012/0078873 A1 | * | 3/2012 | Ferrucci | G06N 5/02 707/708 |
| 2012/0158703 A1 | * | 6/2012 | Li | G06F 17/30693 707/723 |
| 2013/0006760 A1 | * | 1/2013 | Brenner | G06Q 30/02 705/14.49 |

* cited by examiner

*Primary Examiner* — Robert Beausoliel, Jr.
*Assistant Examiner* — Susan F Rayyan
(74) *Attorney, Agent, or Firm* — Schwegman Lundberg & Woessner, P.A.

(57) ABSTRACT

Generally discussed herein are systems and methods for lexically enriching structured and semi-structured data. In one or more embodiments, a method can include receiving a code, lexicalizing the code, lexically combining the lexicalized code with a lexical descriptor, and sending the lexical combination to a keyword database.

15 Claims, 5 Drawing Sheets

LEXICAL ENRICHMENT OF STRUCTURED AND SEMI-STRUCTURED DATA

RELATED APPLICATION

This application claims priority to U.S. Provisional Application Ser. No. 61/658,444 (entitled "Lexical Enrichment of Structured and Semi-Structured Data", filed Jun. 12, 2012) which is incorporated herein by reference in its entirety.

GOVERNMENT RIGHTS

This invention was made with United States Government support under Contract Number DOJ-FBI-2007-C-2492. The United States Government has certain rights in this invention.

BACKGROUND

The user-friendly keyword search paradigm that has proven successful for searching the unstructured content of text databases and the Web is also attractive as a means of searching structured and semi-structured data. This invention addresses the problem of how to apply keyword search to structured and semi-structured data. The fundamental obstacle that must be overcome is that keyword search relies on matching query keywords with unstructured data whose semantics is lexically defined whereas the semantics of structured and semi-structured data is largely defined by its schema or other metadata rather than by its lexical content.

Existing approaches to enabling keyword search on structured and semi-structured data use ad hoc heuristics to automate the identification of semantic content in database schemas and allow this content to contribute to keyword matches. The combination of keyword matches arising from the new content extracted from schemas and the existing structured content are then used to reformulate the keyword query into a query using the database's native query language and retrieve results. These approaches suffer from the following problems: 1. The heuristics used to extract semantic content from schemas typically make naive assumptions about the properties of schemas which can result extracted content that leads to poor precision and recall. 2. The structured queries to which the keyword queries are transformed do not support the concept of ranking search results according to a relevancy score and require the creation new mechanisms for relevancy calculation rather than leveraging the highly evolved methods used by full text search engines. 3. Structurally distinct data cannot be composed to represent the semantics of compound concepts. 4. Content is not linguistically well-formed and does not support searches that specify the order and proximity of query keywords as a means to improve precision. 5. Coded data and other lexically incoherent structured data is not addressed. 6. No accommodation is made for the case where the database contains both structured and unstructured content.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DESCRIPTION OF EMBODIMENTS

Figure 1:
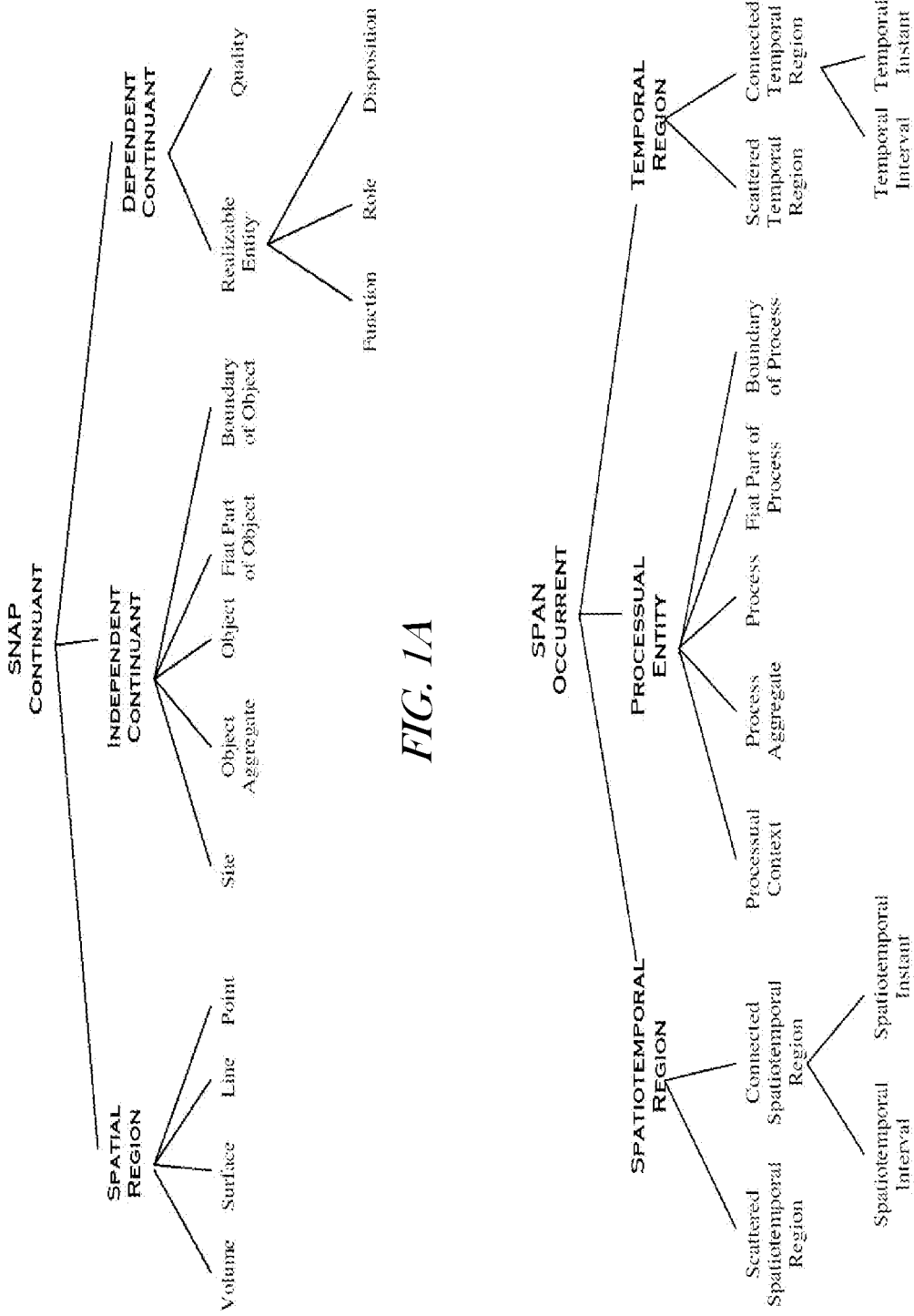
FIG. 1A is a diagram depicting an example of SNAP continuant relations taken from "Ontology for the Twenty First Century: An Introduction with Recommendations" authored by Andrew D. Spear.
FIG. 1B is a diagram depicting an example of SPAN occurrent relations taken from "Ontology for the Twenty First Century: An Introduction with Recommendations" authored by Andrew D. Spear.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Lexical enrichment solves the problem of keyword search on lexically deficient structured and semi-structured data by using schema and metadata as well as the definitions of coded data to create linguistically complete and well-formed lexical content suitable for indexing by a full text search engine. The lexical enrichment approach generates full text semantics for structured and semi-structured data in order to leverage existing full text search technology rather than trying to achieve keyword search on top of a structured or semi-structured database. A key advantage of the lexical enrichment technique is its ability to enrich structured and semi-structured data in a consistent and predictable way that produces content that corresponds to the conventional way of saying things. This is achieved by adopting a strongly semantic interpretation of relevancy between query keywords and database content in which query keywords are assumed to closely resemble a grammatical predicate phrase that expresses a property that may be predicated of entities described in the database. Under this interpretation, database content is relevant to a query if it describes one or more entities for which the query predication holds. The goal of lexical enrichment is to create database content in the form of predicate phrases that express predication in the same way as a user's keyword query is likely to express predication. This in turn requires rules that constrain how predicate phrases are constructed from structured data and its relevant schema/metadata and code definitions (if applicable). The key to formulating these rules that guide lexical enrichment is a novel view of syntactic predication that takes into account how the ontological status of the grammatical subject entities and object entities constrain the form of predicate phrases.

There are three novel features of lexical enrichment: 1. The schema, metadata and code semantics associated with structured and semi-structured data is used to generate linguistically well-founded lexical content that is directly amenable to keyword search using full text search technology and for which keyword order and proximity may be exploited to improve search precision. 2. A strongly semantic view of keyword search is adopted in which query keywords are assumed closely resemble a grammatical predicate phrase that expresses a property that may be predicated of entities described in the database and database content that matches the query keywords is assumed to identify entities for which the query predicate phrase holds. 3. The generation of lexical content is guided by a theory of syntactic predication that takes into account how the ontological status of the grammatical subject entities and object entities constrain the form of predicate phrases.

The goal of lexical enrichment is to add sufficient lexical context to structured and semi-structured data to enable keyword search to be effective. Lexical enrichment is driven by a strongly semantic interpretation of relevancy between query keywords and database content in which query keywords are assumed to closely resemble a grammatical predicate phrase that expresses a property that may be predicated of entities described in the database. Under this interpretation, database content is relevant to a query if it describes one or more entities for which the query predication holds. The goal of lexical enrichment is to create database content in the form of predicate phrases that express predication in the same way as a user's keyword query is likely to express predication. This in turn requires rules that constrain how predicate phrases are constructed from structured data and its relevant schema/metadata and code definitions (if applicable). The rules that guide lexical enrichment take into account how the ontological status of the grammatical subject entities and object entities constrain the form of predicate phrases. The ontological status of entities may be determined by classifying them with respect to the categories of an appropriate upper ontology. Upper ontologies describe very general concepts that are the same across all knowledge domains. Although several upper ontologies have gained prominence, Basic Formal Ontology (BFO) is chosen due to its conciseness, complete axiomatization, and philosophical rigor. BFO was developed as part of work done at the institute of Formal Ontology and Medical Information Science (IFOMIS) in Saarbrucken Germany and at the University of Buffalo.

BFO distinguishes two main categories of entities: continuants (called SNAP entities as in snapshot in time) and occurrents (called SPAN entities as in spanning time). SNAP entities have the following characteristics: 1) enjoy continuous existence in time; 2) preserve the identity through change; and 3) exist in toto at every moment at which they exist at all. In contrast, SPAN entities: 1) have temporal parts (or they are instantaneous temporal boundaries of entities which have temporal parts); 2) unfold themselves phase by phase; 3) exist only in there successive phases.

FIG. 1A is a logical block diagram of an example of SNAP continuant categories from Ontology for the Twenty First Century: An Introduction with Recommendations, 2006, Andrew D. Spear, Saarbrucken, Germany, available at http://www.ifomis.org/bfo/documents/manual.pdf (last accessed May 18, 2013) (hereinafter "BFO Manual"). FIG. 1A shows the subcategories of SNAP continuant entities. The subcategories are defined as follows: 1) Spatial Region—An independent continuant entity that is neither a bearer of qualities nor inheres in any other entities. The 'space' of spatial regions is the absolute or total space of physics and so is generally only applicable to building a domain ontology for representing information about physics. Examples of spatial regions include: (a) Volume (V)—a spatial region with three dimensions; (b) Surface (SR)—A spatial region with two dimensions; (c) Line (L)—A spatial region with one dimension; (d) Point (PT)—A spatial region with no dimensions.

2) Independent Continuant (IC)—Continuant entities in which other (quality and realizable) entities inhere and which themselves cannot inhere in anything. Examples ICs includes: (a) Site (S)—An in dependent continuant entity that has a characteristic spatial shape in relation to some arrangement of other continuant entities and of the medium which is enclosed in whole or in part by this characteristic shape. (b) Object Aggregate (OA)—An in dependent continuant entity that is a mereological sum of separate objects. (c) Object (O)—An independent continuant that is spatially extended, maximally connected and self-contained, possesses internal unity and has an identity that is independent of other entities and is maintained through time and through loss and gain of parts and qualities. (d) Fiat Part of Object (FO)—An independent continuant that is part of an object but is not demarcated by any physical boundaries.

3) Dependent Continuant (DC)—a continuant that inheres in or is born by another entity. Examples of DCs include: (a) Realizable Entity (RE)—Realizable entities are dependent continuants that inhere in continuant entities and are not exhibited in full at every time in which they inhere in an entity. REs can be broken into at least three categories: (i) Function (F)—A realizable entity the manifestation of which is a process or activity which is directed towards the realization of that entity's essential goal in the context for which the entity is made. (ii) Role (R)—A realizable entity the manifestation of which brings about some result or end that is not essential to an entity in virtue of the kind of thing that it is, but that can be served or participated in by that kind of entity in some kinds of natural, social or institutional contexts. (iii) Disposition (D)—A realizable entity that essentially causes a specific process or transformation in the object in which it inheres, under specific circumstances and in conjunction with the laws of nature. (b) Quality (Q)—A dependent continuant that is exhibited if it inheres in an entity at all.

FIG. 1B is a logical block diagram of an example of SPAN occurrent entities from the BFO manual. FIG. 1A shows the subcategories of SNAP continuant entities. The subcategories are defined as follows: 1) Spatiotemporal Region—A spatiotemporal region is an entity that has temporal parts and that happens, unfolds or develops in time. Examples of spatiotemporal regions include: (a) Scattered Spatiotemporal Region(SSR)—A space time region that has spatial and temporal dimensions, and every spatial and temporal point of which is not connected with every other spatial and temporal point of which. (b) Connected Spatiotemporal Region (CSR)—A space time region that has temporal and spatial dimensions such that all points within the space time region are immediately connected to all other points within the same space time region. Examples of CSRs include: (i) Spatiotemporal Interval (SIT)—A connected space time region that endures for more than a single moment of time. (ii) Spatiotemporal Instant (SIS)—A connected space time region at a specific moment.

2) Processual Entity (PE)—An occurrent entity that exists in time by occurring or happening, has temporal parts, and always depends on some SNAP entity or entities. Examples of PEs include: (a) Processual Context (PC)—An occurrent entity consisting of a characteristic spatial shape inhering in some arrangement of other occurrent entities. PCs are characteristically entities at or in which other occurrent entities can be located or occur. (b) Process Aggregate (PA)—A processual entity that is a mereological sum of processes and possesses non-connected boundaries. (c) Process (P)—A processual entity that is a maximally connected spatio-temporal whole, and has bona fide beginnings and endings corresponding to real discontinuities. (d) Fiat Part of Process (FPP)—A processual entity that is part of a process, but that does not have bona fide beginnings and endings corresponding to real discontinuities. (e) Boundary of Process (BP)—A processual entity that is the fiat or bona fide instantaneous temporal boundary of a process.

3) Temporal Region (TR)—An occurrent entity that is part of time. Examples of TRs include: (a) Scattered Temporal Region (STR)—A TR every point of which is not immediately connected with every other point of which. (b) Connected Temporal Region (CTR)—A TR, every point of which is immediately connected with every other point of which. CTRs can include at least two distinct categories: (i) Temporal Interval (TIT)—A CTR lasting for more than a single moment of time. (ii) Temporal Instant (TIS)—A CTR comprising a single moment of time.

BFO relations are obtained between instances of categories with the exception of "instance_of" relations that obtain between an instance and a category.

The following relations are defined by BFO:

1) instance_of(x:SNAP, SNAP)—denotes that an instance x is an instance of a SNAP category.

2) instance_of(x:SPAN, SPAN)—denotes that an instance x is an instance of a SPAN category.

3) part_of(x:$SNAP_{IC}$, y:$SNAP_{IC}$)—denotes that an instance y of a SNAP independent continuant (IC) entity is a mereological part of an instance x of a SNAP independent continuant (IC) entity.

4) part_of(x:$SPAN_{PE}$, y:$SPAN_{PE}$)—denotes that an instance y of a SPAN processual entity (PE) is a processual part of an instance x of a SPAN processual entity (PE).

5) quality_of(x:$SNAP_{IC}$, y:$SNAP_Q$)—denotes that an instance y is a quality of an instance x of a SNAP independent continuant (IC) entity.

6) function_of(x:$SNAP_{IC}$, y:$SNAP_F$)—denotes that an instance y is a function of an instance x of a SNAP independent continuant (IC) entity.

7) disposition_of(x:$SNAP_{IC}$, y:$SNAP_D$)—denotes that an instance y is a disposition of an instance x of a SNAP independent continuant (IC) entity.

A description of an example of how an ontology structure, such as BFO in this example, can be related to linguistic predication. The general structure underlying syntactic predication is: [[subject phrase] [predicate phrase]]. The following definitions are relevant for syntactic predication:

Subject phrase—the element which refers to something about which an assertion is made in the rest of the sentence.

Predicate phrase—the element which asserts a property or characteristic of the thing referred to by the subject phrase.

Predication—the relation between the property or characteristic referred to by the predicate phrase and the thing referred to by the subject phrase.

Domain of predication—the sentence (clause) in which the subject phrase and predicate phrase occur.

In ontological terms, predication can be seen as specifying that a particular type of formal ontological relation exists between the entity referred to by the subject phrase (subject phrase entity) and the entity that reifies the characteristic or property referred to by the predicate phrase (predicate phrase entity). Therefore, the assertions that can be made about a subject phrase entity are constrained by the types of relations that can exist between the subject phrase entity and predicate phrase entity. These relations are in turn constrained to only include those BFO relations whose signatures are compatible with the ontological categories of the subject phrase entity and the predicate phrase entity.

The ontolinguistically driven lexical enrichment process uses the formal relational constraint between a subject phrase entity and predicate phrase entity to constrain sentence constituent structure. Lexically enriched content can be based on the constrained predicate phrase structure minus any non-content bearing copula verbs and determiners. In the description that follows, the following acronyms are used for convenience: NP—noun phrase; VP—verb phrase; AdjP—adjectival phrase; and AdvP—adverb phrase.

Each of the seven BFO relations are now described in more detail. The ontological relation "instance_of" obtains between an instance and a SNAP or SPAN category of which it is an instance. Therefore, linguistic predication of an instance can include a subject phrase entity that represents an instance of a SNAP or SPAN (SubjP_SNAP or SubjP_SPAN) and a predicate phrase entity that represents the category of the SNAP or SPAN of which it is an instance (PredP_SNAP_Cat or PredP_SPAN_Cat) as follows:

instance_of(x:SNAP, SNAP)->[[SubjP_SNAP][PredP_SNAP_Cat]]

instance_of(x:SNAP, SNAP)->[[SubjP_SPAN][PredP_SPAN_Cat]]

The predicate phrase directly represents a SNAP or SPAN category. The following are examples of valid sentence constituent structures for expressing a quality along with examples of how these structures constrain lexical enrichment:

1. [[[ . . . head_noun$_{SNAP}$]$_{NP}$]$_{SubjP\_SNAP}$[[copula_verb [ . . . head_noun$_{SNAP\_Cat}$]$_{NP}$]$_{VP}$]$_{PredP\_SNAP\_Cat}$]

Some illustrative examples:

[[[the vehicle]$_{NP}$]$_{SubjP\_SNAP}$[[is[red Ford]$_{NP}$]$_{VP}$]$_{PredP\_SNAP\_Cat}$]-> red Ford

[[[the person]$_{NP}$]$_{SubjP\_SNAP}$[[is[white male]$_{NP}$]$_{VP}$]$_{PredP\_SNAP\_Cat}$]-> white male

[[[the person's name]$_{NP}$]$_{SubjP\_SNAP}$[[is[John Smith]$_{NP}$]$_{VP}$]$_{PredP\_SNAP\_Cat}$]-> John Smith 2. [[[ . . . head_noun$_{SPAN}$]$_{NP}$]$_{SubjP\_SPAN}$[[copula_verb [ . . . head_noun$_{SPAN\_Cat}$]$_{NP}$]$_{VP}$]$_{PredP\_SPAN\_Cat}$]

Some illustrative examples:

[[[the offense]$_{NP}$]$_{SubjP\_SPAN}$[[is[aggravated assault]$_{NP}$]$_{VP}$]$_{PredP\_SPAN\_Cat}$]-> aggravated assault

[[[the sentence]$_{NP}$]$_{SubjP\_SPAN}$[[was [supervised probation]$_{NP}$]$_{VP}$]$_{PredP\_SPAN\_Cat}$]-> supervised probation The ontological relation "part_of" only obtains between either two SNAP continuant entities (mereological part of) or two SPAN processual entities (processual part of). Therefore, linguistic predication of a part_of can be a subject phrase entity that represents an SNAP independent continuant entity (SubjP_IC and a predicate phrase entity that represents a SNAP independent continuant entity (PredP_IC) or a subject phrase the represents a SPAN processual entity and predicate phrase that represents a SPAN processual entity as follows:

part_of(x:$SNAP_{IC}$, y:$SNAP_{IC}$)->[[SubjP_IC][PredP_IC]]

part_of(x:$SNAP_{PE}$, y:$SNAP_{PE}$)->[[SubjP_PE][PredP_PE]]

The following are examples of valid sentence constituent structures for expressing a quality along with examples of how these structures constrain lexical enrichment:

1. [[[ . . . head_noun$_{IC}$]$_{NP}$]$_{SubjP\_IC}$[[copula_verb [ . . . head_noun$_{IC}$]$_{NP}$]$_{VP}$]$_{PredP\_IC}$]

Some illustrative examples:

[[[the person]$_{NP}$]$_{SubjP\_IC}$[[has[brown hair]$_{NP}$]$_{VP}$]$_{PredP\_IC}$]-> brown hair

[[[the person]$_{NP}$]$_{SubjP\_IC}$[[has[green eyes]$_{NP}$]$_{VP}$]$_{PredP\_IC}$]-> green eyes

[[[the vehicle]$_{NP}$]$_{SubjP\_IC}$[[has[new tires]$_{NP}$]$_{VP}$]$_{PredP\_IC}$]-> new tires 2. [[[ . . . head_noun$_{PE}$]$_{NP}$]$_{SubjP\_PE}$[[copula_verb[ . . . head_noun$_{PE}$]$_{NP}$]$_{VP}$]$_{PredP\_PE}$]

Some illustrative examples:
[[[the offense]$_{NP}$]$_{SubjP\_PE}$[[included[money laundering]$_{NP}$]$_{VP}$]$_{PredP\_PE}$]-> money laundering
[[[the arrest]$_{NP}$]$_{SubjP\_PE}$[[required[force]$_{NP}$]$_{VP}$]$_{PredP\_PE}$]-> force The ontological relation "quality_of" only obtains between an instance of a SNAP independent continuant entity and an instance of a SNAP quality entity. Therefore, linguistic predication of a quality can include a subject phrase entity that represents an SNAP independent continuant entity (SubjP_IC) and a predicate phrase entity that represents a SNAP quality entity (PredP_Q) as follows:

quality_of(x:SNAP$_{IC}$, y:SNAP$_Q$)->[[SubjP_IC][PredP_Q]]

A quality inheres in an independent continuant entity and is exhibited at all times. Therefore the predicate phrase directly expresses the quality inhering in the independent continuant entity. The following are examples of valid sentence constituent structures for expressing a quality along with examples of how these structures constrain lexical enrichment:

1. [[[ . . . head_noun$_{IC}$]$_{NP}$]$_{SubjP\_IC}$[[copula_verb [ . . . head_adjective$_Q$]$_{AdjP}$]$_{VP}$]$_{PredP\_D}$]
Some illustrative examples:
[[[the person]$_{NP}$]$_{SubjP\_IC}$[[is[very tall]$_{AdjP}$]$_{VP}$]$_{PredP\_D}$]->very tall
[[[the person]$_{NP}$]$_{SubjP\_IC}$[[is[obese]$_{AdjP}$]$_{VP}$]$_{PredP\_D}$]->obese
[[[the person]$_{NP}$]$_{SubjP\_IC}$[[is[intelligent]$_{AdjP}$]$_{VP}$]$_{PredP\_D}$]-> intelligent 2. [[[ . . . head_noun$_{IC}$]$_{NP}$]$_{SubjP\_IC}$[[copula_verb [ . . . head_noun$_Q$]$_{NP}$]$_{VP}$]$_{PredP\_Q}$]
Some illustrative examples:
[[[the person]$_{NP}$]$_{SubjP\_IC}$[[has[a slim build]$_{NP}$]$_{VP}$]$_{PredP\_D}$]-> slim build
[[[the person]$_{NP}$]$_{SubjP\_IC}$[[has[a fair complexion]$_{NP}$]$_{VP}$]$_{PredP\_D}$]->fair complexion 3. [[[ . . . head_noun$_{IC}$]$_{NP}$]$_{SubjP\_IC}$[[copula_action_verb$_Q$ [ . . . head_adjective$_Q$]$_{AdjP}$]$_{VP}$]$_{PredP\_Q}$]
Some illustrative examples:
[[[the drug]$_{NP}$]$_{SubjP\_IC}$[[tastes[good]$_{AdjP}$]$_{VP}$]$_{PredP\_D}$]->tastes good
[[[the person]$_{NP}$]$_{SubjP\_IC}$[[smells[bad]$_{NP}$]$_{VP}$]$_{PredP\_D}$]-> smells bad The ontological relation "function_of" only obtains between a SNAP independent continuant entity and a SNAP function entity. Therefore, linguistic predication of a function can include a subject phrase entity that represents an SNAP independent continuant entity (SubjP_IC) and a predicate phrase entity that represents a SNAP quality entity (PredP_F) as follows:

function_of(SNAP$_{IC}$, SNAP$_Q$)->[[SubjP_IC][PredP_F]]

Since the function of an entity is the realization of an activity or process, the predicate directly expresses that process. The following are examples of valid sentence constituent structures for expressing a function along with examples of how these structures constrain lexical enrichment:

1. [[[ . . . head_noun$_{IC}$]$_{NP}$]$_{SubjP\_IC}$[[ . . . action_verb$_{PE}$ [ . . . head_noun$_{PE}$]$_{NP}$]$_{VP}$]$_{PredP\_F}$]
Some illustrative examples:
[[[the drug]$_{NP}$]$_{SubjP\_IC}$[[treats[bacterial infection]$_{NP}$]$_{VP}$]$_{PredP\_D}$]->treats bacterial infection
[[[a firearm]$_{NP}$]$_{SubjP\_IC}$[[is used[for self defense]$_{NP}$]$_{VP}$]$_{PredP\_D}$]->used for self-defense
[[[a foil]$_{NP}$]$_{SubjP\_IC}$[[is used[for fencing]$_{NP}$]$_{VP}$]$_{PredP\_D}$]-> used for fencing 2. [[[ . . . head_noun$_{IC}$]$_{NP}$]$_{SubjP\_IC}$[[ . . . action_verb$_{PE}$ [ . . . head_noun$_{IC}$]$_{NP}$]$_{VP}$]$_{PredP\_F}$]

Some illustrative examples:
[[[handcuffs]$_{NP}$]$_{SubjP\_IC}$[[restrain-[prisoners]$_{NP}$]$_{VP}$]$_{PredP\_F}$]->restrain prisoners
[[[a bear trap]$_{NP}$]$_{SubjP\_IC}$[[catches[bears]$_{NP}$]$_{VP}$]$_{PredP\_F}$]-> catches bears The ontological relation "role_of" only obtains between a SNAP independent continuant entity and a SNAP role entity. Therefore, linguistic predication of a role can include a subject phrase entity that represents an SNAP independent continuant entity (SubjP_IC) and a predicate phrase entity that represents a SNAP role entity (PredP_R) as follows:

role_of(SNAP$_{IC}$, SNAP$_R$)->[[SubjP_IC][PredP_R]]

A role is a non-essential aspect of an independent continuant entity that is not exhibited or taken on in full at all times. The predicate phrase directly expresses this aspect or role that the independent continuant entity takes on. The following are examples of valid sentence constituent structures for expressing a role along with examples of how these structures constrain lexical enrichment:

1. [[[ . . . head_noun$_{IC}$]$_{NP}$]$_{SubjP\_IC}$[[copula_verb[ . . . head_noun$_F$]$_{NP}$]$_{VP}$]$_{PredP\_R}$]
Some illustrative examples:
[[[the person]$_{NP}$]$_{SubjP\_IC}$[[is[a police officer]$_{NP}$]$_{VP}$]$_{PredP\_R}$]->police officer
[[[the gun]$_{NP}$]$_{SubjP\_IC}$[[was[the murder weapon]$_{NP}$]$_{VP}$]$_{PredP\_R}$]->murder weapon
[[[the person]$_{NP}$]$_{SubjP\_IC}$[[is[a victim]$_{NP}$]$_{VP}$]$_{PredP\_R}$]-> victim The ontological relation "disposition_of" only obtains between a SNAP independent continuant entity and a SNAP disposition. Therefore, linguistic predication of disposition can include a subject phrase entity that represents an SNAP independent continuant entity (SubjP_IC) and a predicate phrase entity that represents a SNAP disposition entity (PredP_D) as follows:

disposition_of(SNAP$_{IC}$, SNAP$_D$)->[[SubjP_IC][PredP_D]]

Consistent with the notion that a disposition is manifested as a quality of an independent continuant entity that undergoes a transformational process under certain conditions, the predicate phrase either expresses the transformational process/action directly or the quality that emerges from it (e.g., wears glasses, putting on glasses, or otherwise adding a verb). The following are examples of valid sentence constituent structures for expressing disposition along with examples of how these structures constrains lexical enrichment:

1. [[[ . . . head_noun$_{IC}$]$_{NP}$]$_{SubjP\_IC}$[[ . . . action_verb$_{PE}$]$_{VP}$]$_{PredP\_D}$]
Some illustrative examples:
[[[the person]$_{NP}$]$_{SubjP\_IC}$[[stutters]$_{VP}$]$_{PredP\_D}$]->stutters
[[[the person]$_{NP}$]$_{SubjP\_IC}$[[limps]$_{VP}$]$_{PredP\_D}$]->limps 2. [[[ . . . head_noun$_{IC}$]$_{NP}$]$_{SubjP\_IC}$[[ . . . action_verb$_{PE}$ [ . . . head_noun$_{IC}$]$_{NP}$]$_{VP}$]$_{PredP\_D}$]
Some illustrative examples:
[[[the person]$_{NP}$]$_{SubjP\_IC}$[[wears[glasses]$_{NP}$]$_{VP}$]$_{PredP\_D}$]-> wears glasses
[[[the person]$_{NP}$]$_{SubjP\_IC}$[[carries[a knife]$_{NP}$]$_{VP}$]$_{PredP\_D}$]-> carries knife 3. [[[ . . . head_noun$_{IC}$]$_{NP}$]$_{SubjP\_IC}$[[ . . . action_verb$_{PE}$ [ . . . head_adverb$_{PE}$]$_{AdvP}$]$_{VP}$]$_{PredP\_D}$]
Some illustrative examples:
[[[the person]$_{NP}$]$_{SubjP\_IC}$[[drives [recklessly]$_{AdvP}$]$_{VP}$]$_{PredP\_D}$]->drives recklessly
[[[the person]$_{NP}$]$_{SubjP\_IC}$[[speaks[softly]$_{AdvP}$]$_{VP}$]$_{PredP\_D}$]-> speaks softly
[[[the person]$_{NP}$]$_{SubjP\_IC}$[[speaks[with a Spanish accent]$_{AdvP}$]$_{VP}$]$_{PredP\_D}$]->speaks with Spanish accent 4. [[[ ... head_noun$_{IC}$]$_{NP}$]$_{SubjP\_IC}$[[copula verb[ ... head_adjective$_{PE}$]$_{AdjP}$]$_{VP}$]$_{PredP\_D}$]

Some illustrative examples:

[[[the person]$_{NP}$]$_{SubjP\_IC}$[[is[talkative]$_{AdjP}$]$_{VP}$]$_{PredP\_D}$]-> talkative

[[[the person]$_{NP}$]$_{SubjP\_IC}$[[is[armed and dangerous]$_{AdjP}$]$_{VP}$]$_{PredP\_D}$]->armed and dangerous

Figure 2:
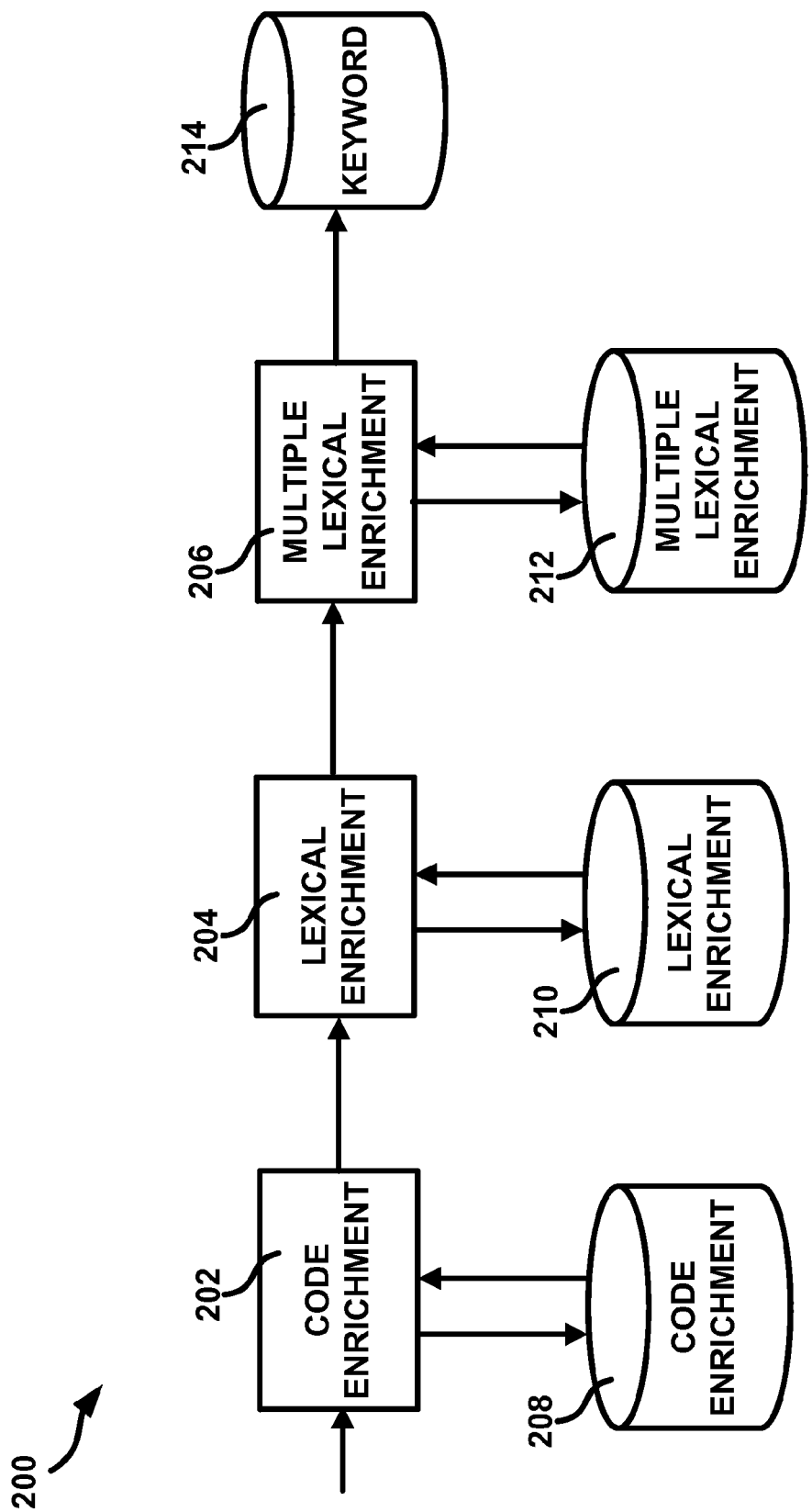
FIG. 2 is a logical block diagram of an example of a system for lexically enriching data.

[[[the person]$_{NP}$]$_{SubjP\_IC}$[[is[left handed]$_{AdjP}$]$_{VP}$]$_{PredP\_D}$]-> left handed FIG. 2 shows an example of a system 200 for lexical enrichment. The system 200 can include a code enrichment module 202, a lexical enrichment module 204, a multiple lexical enrichment module 206, a code enrichment database 208, a lexical enrichment database 210, a multiple lexical enrichment database 212, and a keyword database 214.

The code enrichment module 202 can receive one or more elements on input 216. The element can include a code and a descriptor. For example, in the string "//lexsdigest:Person/nc:PersonHairColorCode='BRN'" "BRN" is the code and "lexsdigest:Person/nc:PersonHairColorCode", or a portion thereof, is the descriptor of the code. In another example, in the string
"//nc:Drug/j:DrugDEACode='H1'", "H1" is the code and "nc:Drug/j:DrugDEACode", or a portion thereof, is the code descriptor.

The code enrichment module 202 can produce a lexical code as a function of the code received. As used herein, lexical means "of or relating to the words of a language". For example, in response to receiving the code "BRN" the code enrichment module 202 can produce the lexical code "brown". In other words, the code enrichment module 202 can receive a non-lexical code and produce a lexical code as a function of the non-lexical code. The code received can be lexical, but need not be so. The element received can be lexically deficient structured or semi-structured data, such as structured data that can be saved in a relational database or semi-structured data (e.g., XML data) that is not entirely unstructured. An example of unstructured data is full-text data.

The code enrichment module 202 can be coupled to the code enrichment database 208. The code enrichment module 202 can send at least part of the element (e.g., the code or the descriptor) to the code enrichment database 208. The code enrichment database 208 can include a plurality of indexed or otherwise organized entries that include the code, descriptor, or both. The code enrichment database 208 can be configured to return a lexical code to the code enrichment module 202 as a function of the code received.

The code enrichment module 202 can send the lexical code, code, descriptor, or element to the lexical enrichment module 204. The lexical enrichment module 204 can produce a lexical descriptor as a function of the descriptor received. For example, in the string "//lexsdigest:Person/nc:PersonHairColorCode='BRN'" the descriptor of the code ("lexsdigest:Person/nc:PersonHairColorCode", or a portion thereof), can be received and the lexical descriptor "hair" can be produced by the lexical enrichment module 204. In another example, in the string
"//lexs:StructuredPayload//ndexia:Person//ndexia:
PersonEyewearCode='Glasses'" the descriptor of the code ("//lexs:StructuredPayload//ndexia:Person//ndexia:PersonEyewearCode", or a portion thereof), can be received and the lexical descriptor "wears" can be produced by the lexical enrichment module 204.

The lexical enrichment module 204 can send the lexical code, code, descriptor, or element to the lexical enrichment database 210. The lexical enrichment database 210 can include a plurality of templates. Each template can be associated with one or more codes, descriptors, or elements, such that when the code, descriptor, or element is received by the lexical enrichment database 210 a lexical descriptor associated with the template can be produced and sent to the lexical enrichment module 204.

The code enrichment module 202 or the lexical enrichment module 204 can be coupled to the multiple lexical enrichment module 206. The code enrichment module 202 can send received elements, lexical codes, or a combination thereof to the multiple lexical enrichment module 206, or the lexical enrichment module can send elements, lexical codes, lexical descriptors, or a combination thereof to the multiple lexical enrichment module 206. Regardless of where the data comes from, the multiple lexical enrichment module 206 can be configured to receive one or more elements, one or more codes, one or more descriptors, one or more lexical codes, one or more lexical descriptors, or a combination thereof. The multiple lexical enrichment module 206 can lexically combine multiple lexical codes with one or more lexical descriptors and produce a compound lexical string. As used herein "lexically combine" means within the constraints of the language of the lexicon being used. For example, lexically combining "hair" and "brown" in the constraints of the English language would produce the lexically combined phrase "brown hair".

For example, the multiple lexical enrichment module 206 can receive the following elements
"//nc:Vehicle/nc: VehicleColorPrimaryCode='LBL'";
"//nc:Vehicle/nc:VehicleStyleCode='4T'";
"//nc:Vehicle/nc:ItemModelYearDate='2005'";
"//nc:Vehicle/nc:VehicleMakeCode='CHEV'";
"//nc:Vehicle/nc:VehicleModelCode='MAL'";
the lexical codes associated with the elements ("light blue", "four door", "hard top", "2005", "Chevrolet", "Malibu", respectively), or the lexical descriptors associated with the elements ("vehicle", "vehicle", "model date", "make", "model", respectively). The multiple lexical enrichment module 206 can produce the lexically combined phrase "light blue 2005 Chevrolet Malibu four door hardtop", in response thereto.

In another example, the multiple lexical enrichment module 206 can receive the following elements
"//lexsdigest:EntityPerson/j:Subject/nc:RoleOfPersonReference";
"//lexsdigest:Person/nc:PersonSexCode='M'";
"//lexs:StructuredPayload//ndexia:Person//nc:
PersonEthnicityCode='N'";
"//lexs:StructuredPayload//ndexia:Person//nc:
PersonRaceCode='W'";
the lexical codes associated with the elements (not applicable, "male", "nonHispanic", or "white", respectively), the codes associated with each element ("subject", "M", "N", or "W", respectively), the descriptors associated with each element ("//lexsdigest:EntityPerson/j:Subject/nc:RoleOfPersonReference", "lexsdigest:Person/nc:PersonSexCode",
"//lexs:StructuredPayload//ndexia:Person//nc:PersonEthnicityCode", or
"//lexs:StructuredPayload//ndexia:Person//nc:PersonRaceCode", respectively), or the lexical descriptors ("subject", "sex", "ethnicity", or "race", respectively) and produce the lexically combined phrase "nonHispanic white male subject".

Similar to the lexical enrichment database 210, the multiple lexical enrichment database 212 can include a plurality of templates. Each template can be associated with one or more codes, lexical codes, descriptors, lexical descriptors, or elements, such that when a specified combination of code, descriptor, lexical code, lexical descriptor, or element is received by the multiple lexical enrichment database 212 one or more lexical descriptors or combined lexical phrases associated with the template can be produced and sent to the lexical enrichment module 204.

The lexical enrichment module 204, the lexical enrichment database 210, multiple lexical enrichment module 206, multiple lexical enrichment database 212, or the keyword database 214 can lexically combine one or more lexical codes with one or more lexical descriptors. The combination of the lexical code and the lexical descriptor can be constrained by the ontological relationship(s) between the lexical code and the lexical descriptor, such as is discussed previously.

The keyword database 214 can include indexed lexically combined phrases and optionally one or more of their associated elements, code, descriptors, lexical codes, or lexical descriptors. The keyword database 214 can include, or be coupled to another database that includes, structured or semi-structured data, such that when a keyword search is performed, the keyword database can associate the keywords searched (e.g., keywords that are spell-checked or grammatically corrected) with the structured or semi-structured data and return data related to the one or more keywords.

Figure 3:
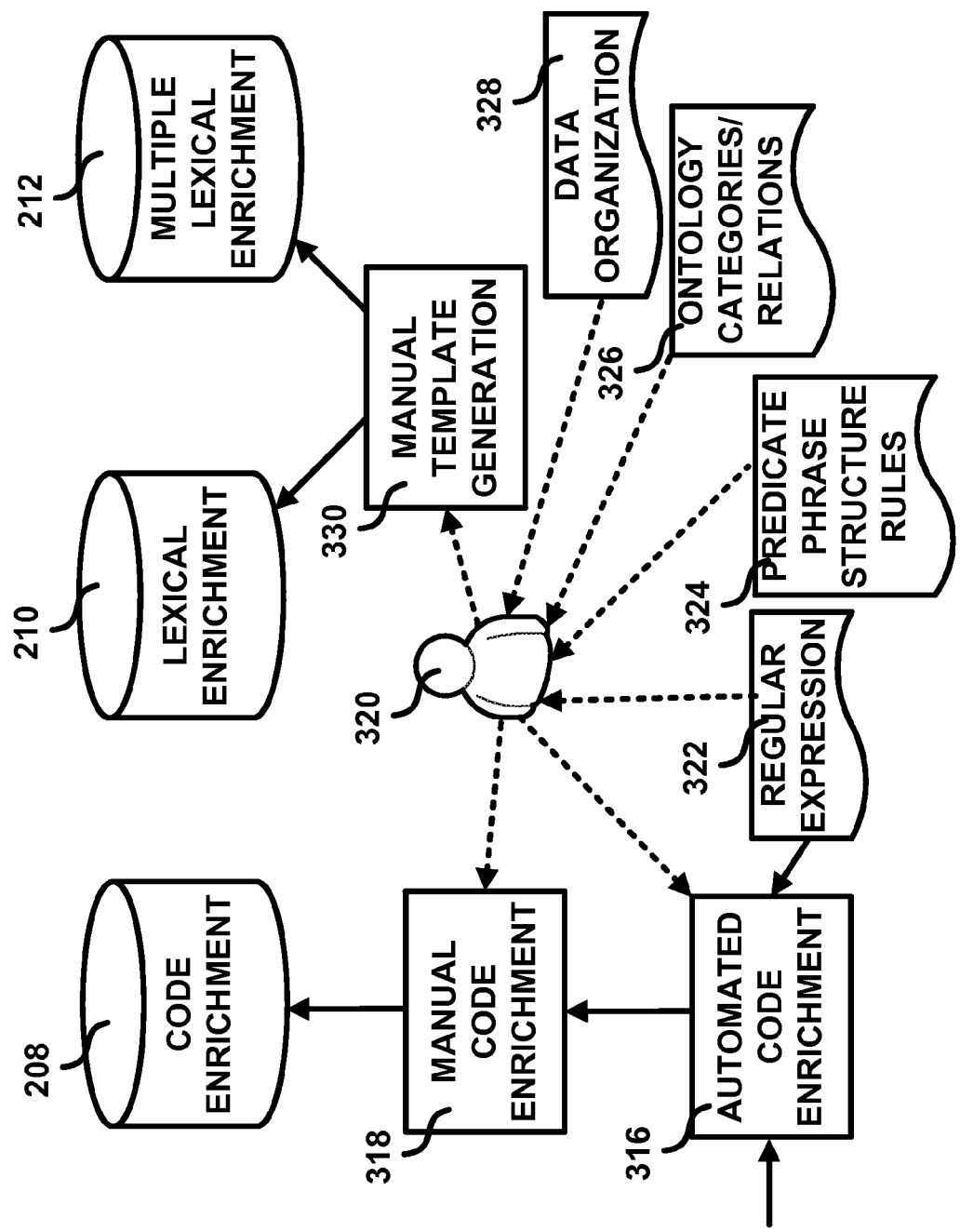
FIG. 3 is a logical block diagram of an example of a system for populating one or more databases in a system for lexically enriching data.

FIG. 3 shows one or more examples of how the code enrichment database 208, lexical enrichment database 210, or the multiple lexical enrichment database 212 can be populated.

Code definitions can be received at an automated code enrichment module 316. The code definitions can be indexed or otherwise organized to be searchable and provide a lexical code for each code received that the automated code enrichment module 316. The automated code enrichment module 316 can be coupled to or include a regular expression library 322 configured to automate populating the code enrichment database 208 with a lexical code for each code stored therein. The automated process can be reviewed or otherwise overseen by a user 320. The user can enter manual changes to the lexical codes or codes produced, such as through the manual code enrichment module 318. A user 320 can add a regular expression to the regular expression library 322 so as to help automate the process of adding lexical codes to the code enrichment database 208. Such a configuration can allow the entered lexical codes or other entries or rules to be reused in future searches. Individual regular expressions can be applicable to multiple codes or can offer guidance in constructing new regular expressions. For example, a linguistically formed phrase with ordering of head noun and modifier of "head noun, modifier" (e.g., "hatchback, four-door") can be processed by the regular expression "(.+), (.+)->$2 $1" to produce the linguistically formed phrase "modifier, head noun" (e.g., "four-door, hatchback").

A user 320 can take regular expression library 322 data, predicate phrase structure rule 324 data, ontology categories/relations 326 data, or data organization 328 data, into account when creating templates, such as by using the manual template generation module 330. The templates created using the manual template generation module 330 can be sent to the lexical enrichment module 210 or the multiple lexical enrichment module 212, as appropriate.

The regular expression library 322 data can include one or more sequences of text characters, such as characters with symbolic meaning (e.g., metacharacters) or characters with a literal meaning, or a combination thereof, that together can automatically identify textual material of a given pattern, or process a number of instances of it that can vary from a precise equality to a very general similarity of the pattern. A regular expression can pattern a match to a string. The regular expression can be employed in a search to identify text for further processing, such as displaying or altering the match. As used herein, "automatically" means without human intervention. Of course some human interaction is required to get the embodiment operating, but one or more portions of the process can be accomplished without human intervention after the embodiment is running.

The predicate phrase structure rules 324 data can include the BFO predicate phrase structure rules presented herein or other ontology based predicate phrase structure rules. Some examples of other ontologies include the Descriptive Ontology for Linguistic and Cognitive Engineering (DOLCE), the General Formal Ontology (GFO), and the Unified Foundational Ontology (UFO). The ontology categories/relations 326 data can be the BFO categories and relations discussed herein or other ontological relations/categories. The data organization 328 data can include a description of the data that is received or how to interpret the data that is received. For example, if the data received is eXtensible Markup Language (XML) data, the data organization 328 data can describe that XML data includes a variety of characters (e.g., Unicode characters) and the XML data includes a "markup", "content", "tag", "element", "attribute", or a combination thereof. The data can explain what each of these means, give examples of each, or give direction how to interpret each.

Figure 4:
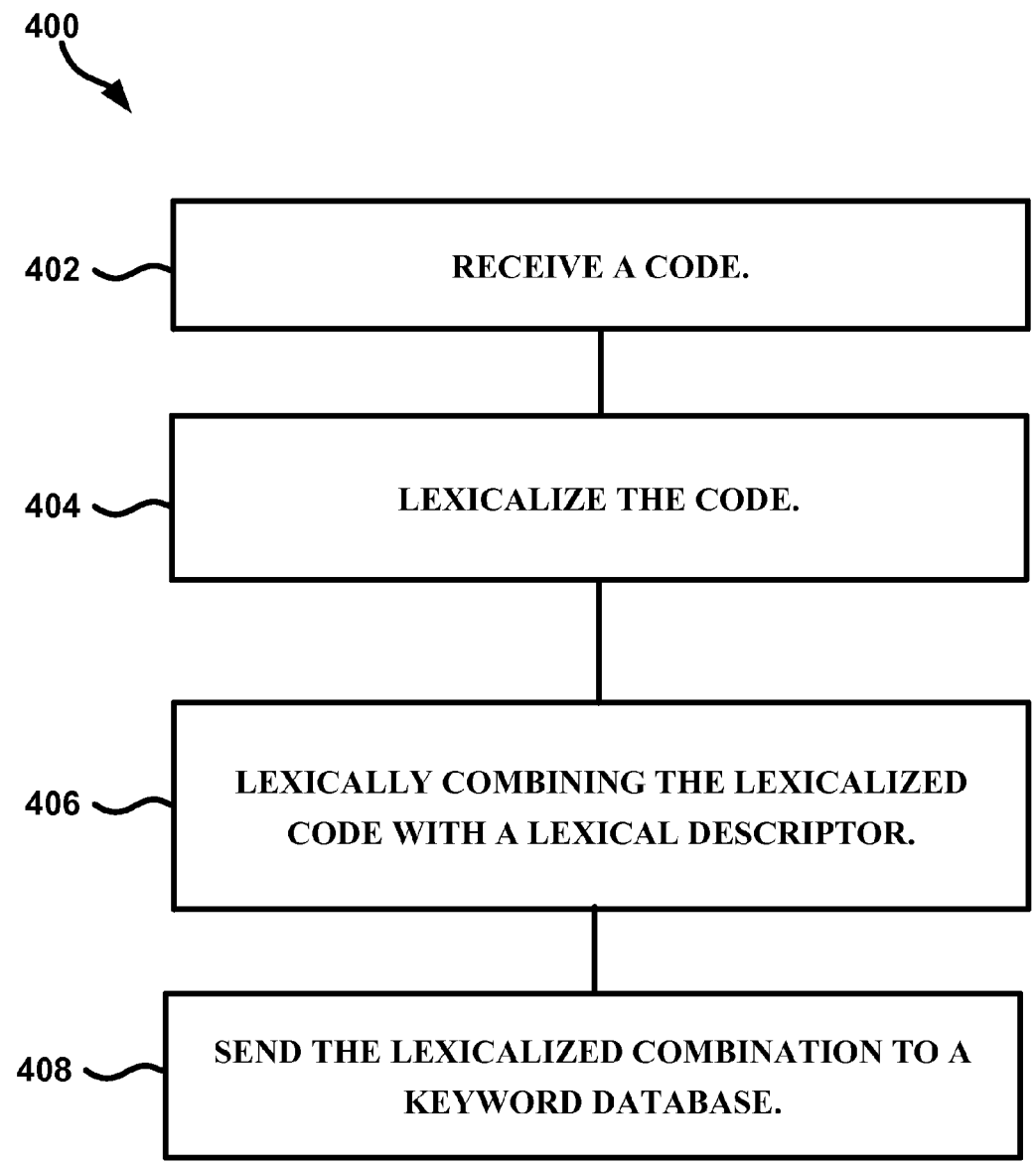
FIG. 4 is a flow diagram of an example of a technique for lexically enriching data.

FIG. 4 illustrates a flow diagram of a technique 400 for producing lexically enriched content. At 402, a code can be received, such as at a code enrichment module 202. Receiving the code can include receiving an element that includes the code and a code descriptor. Receiving the code can include receiving a plurality of elements each including a respective code and at least two of the codes each include a same code descriptor. The received element (e.g., code or descriptor) can be in an XML or other structured data format, such as data formatted for use in a relational database.

At 404, the code can be lexicalized, such as by the code enrichment module 202, the regular expression library 322 included in the code enrichment module 202, or the code enrichment database 208. Lexicalizing the code can include looking up the code in the code enrichment database 208 and determining a lexical word associated with the code. Lexicalizing the code can include lexicalizing a plurality of codes. Lexicalizing the code can include using the regular expression library module 322 to compute a lexicalized version of the code automatically. Lexicalizing the code can include lexical negation rather than grammatical negation. For example if the element "AutomaticWeaponIndicator=false" were received, the code enrichment module 202 could return the lexically negated and enriched phrase "nonautomatic weapon" rather that the grammatically negated lexically enriched phrase "not an automatic weapon" can be returned. In another example, if the element "PersonUSCitizenIndicator=false" were received the lexically negated and enriched phrase "noncitizen", rather than the grammatically negated and lexically enriched phrase "not a US citizen", can be returned. Such a configuration can increase the chances of a user entering keywords and getting expected results.

At 406, lexicalized code can be lexically combined with a lexical descriptor, such as by using lexical enrichment module 204, multiple lexical enrichment module 212, lexical enrichment database 210, multiple lexical enrichment database 212, or keyword database 214. Lexically combining the lexicalized code can include looking up a code descriptor template in a template database as a function of the code descriptor to determine a lexical descriptor to lexically combine with the lexicalized code. Lexically combining the lexicalized code can include lexically combining multiple lexicalized codes and a lexical descriptor associated with the code descriptor. Lexically combining the lexical code with the lexical descriptor can include constraining the lexical combination by an ontological relationship between the lexical code and the lexical descriptor. At 408, the lexical combination can be sent to a keyword database 212.

Figure 5:
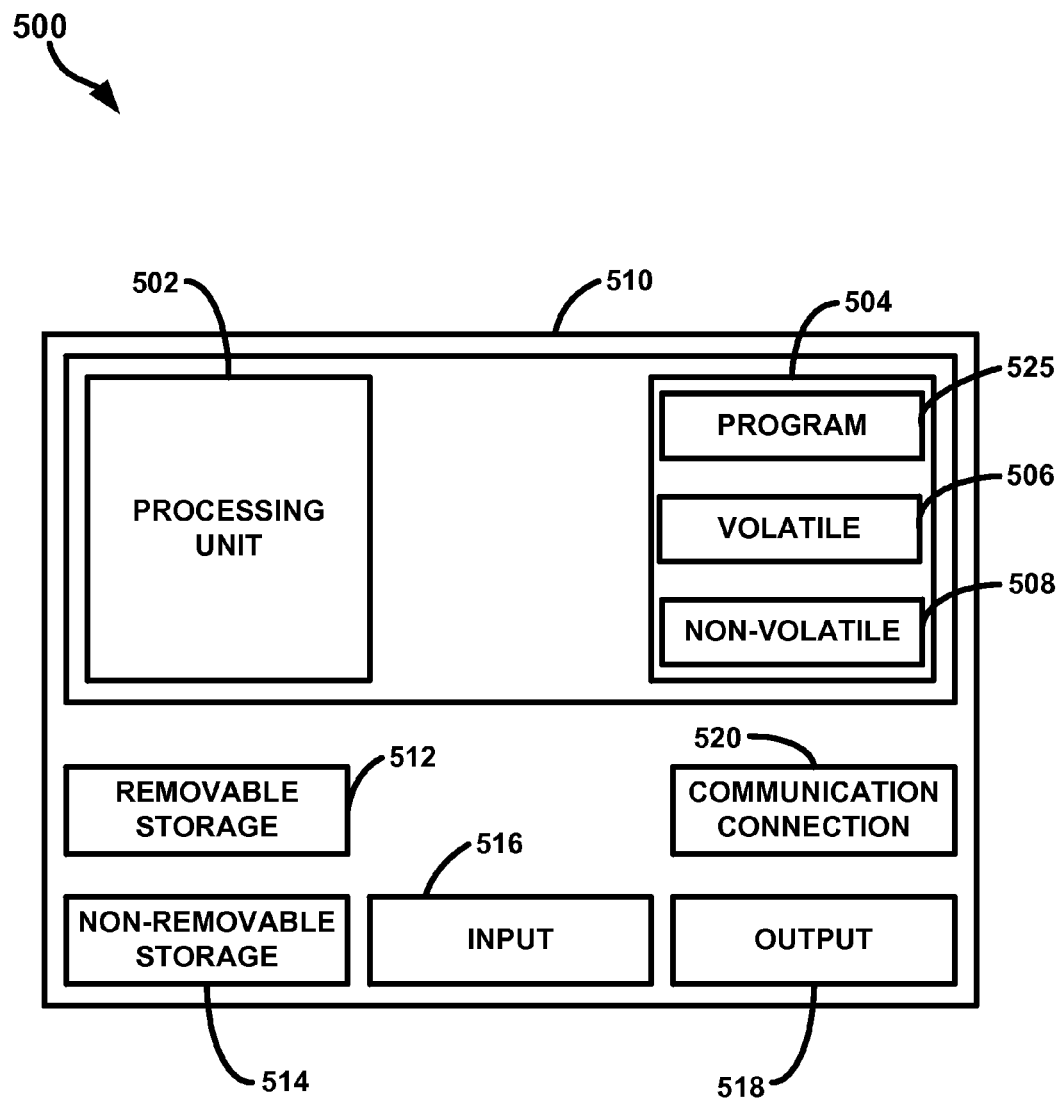
FIG. 5 is a logical block diagram of an example of a computer system.

FIG. 5 is a block diagram of a computing device 500, according to an example embodiment. In one or more embodiments, multiple such computer devices 500 can be utilized in a distributed network to implement multiple components in a transaction-based environment. An object-oriented, service-oriented, or other architecture can be used to implement such functions and communicate between the multiple systems and components. An example computing device in the form of a computer 510 can include a processing unit 502, memory 504, removable storage 512, and non-removable storage 514. Memory 504 can include volatile memory 505 and non-volatile memory 508. Computer 510 can include—or have access to a computing environment that includes—a variety of computer-readable media, such as volatile memory 506 and non-volatile memory 508, removable storage 512 and non-removable storage 514. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 510 can include or have access to a computing environment that includes input 516, output 518, and a communication connection 520 that may include a communications module to communicate with mobile devices via a port coupled to a network connection such as the internet or cellular network. The computer can operate in a networked environment using a communication connection to connect to one or more remote computers, such as database servers. The remote computer can include a personal computer (PC), server, router, network PC, a peer device or other common network node, or the like. The communication connection can include a Local Area Network (LAN), a Wide Area Network (WAN) or other networks.

Computer-readable instructions stored on a computer-readable medium are executable by the processing unit 502 of the computer 510. A hard drive, CD-ROM, and RAM are some examples of articles including a non-transitory computer-readable medium. For example, a computer program 525 capable of performing one or more of the methods illustrated and described herein can be stored on a non-transitory computer-readable medium. An example of such a computer program can include a computer readable storage device including instructions stored thereon, the instructions, which when executed by a machine, cause the machine to perform operations including receiving, at a processor, a code, lexicalizing, using the processor, the code, lexically combining the lexicalized code with a lexical descriptor, and sending the lexical combination to a keyword database.

One or more embodiments discussed herein can help a user by reducing the amount of knowledge a user needs to have to search the structured or semi-structured data. For example, a user may be able to search the data without knowing the format of the data or the intricacies of the format.

ADDITIONAL NOTES AND EXAMPLES

In Example 1a method includes receiving, at a processor, a code.

In Example 2, the method of Example 1 can include lexicalizing, using the processor, the code.

In Example 3, the method of at least one of Examples 1-2 can include lexically combining the lexicalized code with a lexical descriptor.

In Example 4, the method of at least one of Examples 1-3 can include sending the lexical combination to a keyword database.

In Example 5, lexicalizing the code of at least one of Examples 1-4 can include looking up the code in a code enrichment database to determine a lexical word associated with the code.

In Example 6, receiving the code of at least one of Examples 1-5 can include receiving an element that includes the code and a code descriptor.

In Example 7, lexically combining the lexicalized code of at least one of Examples 1-6 can include looking up a code descriptor template in a template database as a function of the code descriptor to determine a lexical descriptor to lexically combine with the lexicalized code.

In Example 8, receiving the code of at least one of Examples 1-7 can include receiving a plurality of elements each including a respective code and the plurality of codes each include a same code descriptor.

In Example 9, lexicalizing the code of at least one of Examples 1-8 can include lexicalizing the plurality of codes.

In Example 10, lexically combining the lexicalized code of at least one of Examples 1-9 can include lexically combining all of the lexicalized codes and a lexical descriptor associated with the code descriptor.

In Example 11, lexicalizing the code of at least one of Examples 1-10 can include using the processor and a regular expression library to compute a lexicalized version of the code automatically.

In Example 12, lexically combining the lexical code with the lexical descriptor of at least one of Examples 1-11 can include constraining the lexical combination by an ontological relationship between the lexical code and the lexical descriptor.

In Example 13, the received code of at least one of Examples 1-12 can be in an Extensible Markup Language (XML) format.

In Example 14a system can include a code enrichment module, the code enrichment module executable by a processor and configured to receive a code and produce a lexical word as a function of the code.

In Example 15, the system of at least one of Examples 1-14 can include a lexical enrichment module, the lexical enrichment module executable by a processor and configured to receive a code descriptor associated with the code, produce a lexical descriptor as a function of the code descriptor, and lexically combine the lexical word with the lexical descriptor.

In Example 16, the system of at least one of Examples 1-15 can include a database configured to (1) receive the code, the descriptor, the lexical code, and the lexical descriptor, (2) associate the code, the descriptor, the lexical code, and the lexical descriptor, and (3) store the code, the descriptor, the lexical code, and the lexical descriptor word such that a user can search at least partially structured data by submitting a keyword search string that includes one or more of the lexical code and the lexical descriptor.

In Example 17, the system of at least one of Examples 1-16 can include a code enrichment database coupled to the code enrichment module and including a plurality of indexed codes and a respective lexical code for each indexed code.

In Example 18, the system of at least one of Examples 1-17 can include a regular expression module configured to receive the code and compute the lexical code automatically.

In Example 19, the lexical enrichment module of at least one of Examples 1-18 can be configured to lexically combine the lexical descriptor to the lexical word as a function of an ontological relationship between the lexical code and the lexical descriptor.

In Example 20, the system of at least one of Examples 1-19 can include a lexical enrichment database including a template stored therein, the template associated with a lexical code, a code descriptor, and a lexical descriptor, and the lexical enrichment database configured to produce the lexical descriptor as a function of the lexical code and the code descriptor.

In Example 21 a computer readable storage device includes instructions stored thereon, the instructions, which when executed by a machine, cause the machine to perform operations including receiving, at a processor, a code.

In Example 22, the storage device of at least one of Examples 1-21 can include instructions stored thereon, which when executed by the machine, cause the machine to perform operations including lexicalizing, using the processor, the code.

In Example 23, the storage device of at least one of Examples 1-22 can include instructions stored thereon, which when executed by the machine, cause the machine to perform operations including lexically combining the lexicalized code with a lexical descriptor.

In Example 24, the storage device of at least one of Examples 1-23 can include instructions stored thereon, which when executed by the machine, cause the machine to perform operations including sending the lexical combination to a keyword database.

In Example 25, the instructions for lexicalizing the code of at least one of Examples 1-24 can include instructions for looking up the code in a code enrichment database and determining a lexical word associated with the code.

In Example 26, the instructions for receiving the code of at least one of Examples 1-25 can include instructions for receiving an element that includes the code and a code descriptor.

In Example 27, the instructions for lexically combining the lexicalized code of at least one of Examples 1-26 can include instructions for looking up a code descriptor template in a template database as a function of the code descriptor to determine a lexical descriptor to lexically combine with the lexicalized code.

In Example 28, the instructions for receiving the code of at least one of Examples 1-27 include instructions for receiving a plurality of elements each including a respective code and the plurality of codes each include a same code descriptor.

In Example 29, the instructions for lexicalizing the code of at least one of Examples 1-28 can include instructions for lexicalizing the plurality of codes.

In Example 30, the instructions for lexically combining the lexicalized code of at least one of Examples 1-29 can include instructions for lexically combining all of the lexicalized codes and a lexical descriptor associated with the code descriptor.

In Example 31, the instructions for lexicalizing the code of at least one of Examples 1-30 can include instructions for using the processor and a regular expression library to compute a lexicalized version of the code automatically.

In Example 32, the instructions for lexically combining the lexical code with the lexical descriptor of at least one of Examples 1-31 can include instructions for constraining the lexical combination by an ontological relationship between the lexical code and the lexical descriptor.

In Example 33, the instructions for receiving the code of at least one of Examples 1-32 can include instructions for receiving the code in an Extensible Markup Language (XML) format.

Some embodiments implement the functions in two or more specific interconnected hardware modules or devices with related control and data signals communicated between and through the modules, or as portions of an application-specific integrated circuit. A module can include software, hardware, firmware, or a combination thereof. The module can be executable by a processor, such as to cause a machine to perform one or more operations. The process flows are applicable to software, firmware, or hardware implementations.

Systems and methods of the present disclosure may be implemented on a mobile device as a mobile application, web-based application, on a desktop computer as a computer application, or a combination thereof. A mobile application may operate on a Smartphone, tablet computer, portable digital assistant (PDA), ruggedized mobile computer, or other mobile device. The mobile device may be connected to the Internet or network via Wi-Fi, Wide Area Network (WAN), cellular connection, WiMax, or any other type of wired or wireless method of networking connection. In some embodiments, a web-based application may be delivered as a software-as-a-service (SaaS) package (e.g. cloud-based embodiments) accessible via a device app, a web browser application, or other suitable application, depending on the particular embodiment.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

It will be readily understood to those skilled in the art that various other changes in the details, material, and arrangements of the parts and method stages which have been described and illustrated in order to explain the nature of the inventive subject matter can be made without departing from the principles and scope of the inventive subject matter as expressed in the subjoined claims.

What is claimed is:
1. A method comprising:
   receiving, at one or more processors, a non-lexical code and a non-lexical code descriptor, the non-lexical code and the non-lexical code descriptor from structured data;
   determining a lexical code and a lexical code descriptor based on the received non-lexical code and non-lexical code descriptor;

lexically combining, using the one or more processors, the lexical code with the lexical code descriptor based on a template that indicates how to lexically combine the lexical code and the lexical code descriptor, wherein lexically combining the lexical code with the lexical code descriptor includes constraining the lexical combination by an ontological relationship between the lexical code and the lexical code descriptor as indicated in the template; and associating the lexically combined lexical code and lexical code descriptor with the non-lexical code and the non-lexical code descriptor in a keyword database.

2. The method of claim 1, wherein determining the lexical code includes looking up the code in a code enrichment database to determine a lexical word associated with the code.

3. The method of claim 1, wherein:
receiving the non-lexical code includes receiving a plurality of elements each including a respective non-lexical code and a same non-lexical code descriptor;
determining the lexical code includes determining a lexical code for each of the plurality of non-lexical codes; and
lexically combining the lexical code includes lexically combining each lexical code with the lexical code descriptor associated with the code descriptor.

4. The method of claim 1, wherein determining the lexical code includes using the processor and a regular expression library to compute a lexicalized version of the code automatically.

5. The method of claim 1, wherein the received non-lexical code is in an Extensible Markup Language (XML) format.

6. A system comprising:
a memory;
one or more processors coupled to the memory, the one or more processors to execute instructions on the memory so as to implement modules including:
a code enrichment module configured to receive a non-lexical code and produce a lexical code as a function of the non-lexical code; and
a lexical enrichment module configured to receive a non-lexical code descriptor associated with the non-lexical code, produce a lexical code descriptor as a function of the non-lexical code descriptor, and lexically combine the lexical code with the lexical code descriptor based on a template that indicates how to :lexically combine the lexical code and the lexical code descriptor; and a keyword database to (1) receive the code, the code descriptor, the lexical code, and the lexical code descriptor, (2) associate the code, the code descriptor, the lexical code, and the lexical code descriptor, and (3) store the code, the code descriptor, the lexical code, and the lexical code descriptor word such that a user can search at least partially structured data that includes the non-lexical code and the non-lexical code descriptor by submitting a keyword search string that includes one or more of the lexical code and the lexical code descriptor, wherein the lexical enrichment module is configured to lexically combine the lexical code descriptor to the lexical code as a function of an ontological relationship between the lexical code and the lexical code descriptor.

7. The system of claim 6, further comprising:
a code enrichment database coupled to the code enrichment module and including a plurality of indexed non-lexical codes and a respective lexical code for each indexed non-lexical code.

8. The system of claim 6, further comprising a regular expression module configured to receive the non-lexical code and compute the lexical code automatically.

9. The system of claim 6, further comprising a lexical enrichment database coupled to the lexical enrichment module including a plurality of templates stored therein, the templates each associated with a lexical code, a non-lexical code descriptor, and a lexical code descriptor, and the lexical enrichment database configured to produce the lexical code descriptor as a function of the lexical code and the non-lexical code descriptor.

10. A non-transitory computer readable storage device including instructions stored thereon, the instructions, which when executed by a machine, cause the machine to perform operations comprising;
receiving, a non-lexical code and a non-lexical code descriptor, the non-lexical code and the non-lexical code descriptor from structured data;
determining a lexical code and a lexical code descriptor based on the received non-lexical code and non-lexical code descriptor;
lexically combining the lexical code with the lexical code descriptor based on a template that indicates how to lexically combine the lexical code and the lexical code descriptor, wherein the instructions for lexically combining the lexical code with the lexical code descriptor include instructions for constraining the lexical combination by an ontological relationship between the lexical code and the lexical code descriptor; and
associating the lexically combined lexical code and lexical code descriptor with the non-lexical code and the non-lexical code descriptor in a keyword database.

11. The storage device of claim 10, wherein the instructions for lexicalizing the code includes instructions for looking up the non-lexical code in a code enrichment database to determine a lexical code associated with the non-lexical code.

12. The storage device of claim 10, wherein the instructions for receiving the non-lexical code include instructions for receiving an element that includes the non-lexical code and the non-lexical code descriptor; and
wherein the instructions for lexically combining the lexical code with the lexical code descriptor include instructions for looking up a code descriptor template in a lexical enrichment database as a function of the non-lexical code descriptor and the lexical code to determine the lexical code descriptor.

13. The storage device of claim 10, wherein the instructions for receiving the non-lexical code include instructions for receiving a plurality of elements each including a respective non-lexical code and a same non-lexical code descriptor;
wherein the instructions for determining the lexical code include instructions for determining a plurality of lexical codes; and
wherein the instructions for lexically combining the lexical code include instructions for lexically combining all of the lexicalized codes and a lexical code descriptor associated with the same code descriptor.

14. The storage device of claim 10, wherein the instructions for determining the lexical code include instructions for using a regular expression library to compute the lexical code automatically.

15. The storage device of claim 10, wherein the instructions for receiving the non-lexical code include instructions for receiving the non-lexical code in an Extensible Markup Language (XML) format.

* * * * *